Patented Feb. 11, 1947

2,415,558

UNITED STATES PATENT OFFICE 2,415,558

PREPARATION OF ACIDS

James C. Hesler and Abraham Sidney Behrman, Chicago, Ill., assignors to Infilco, Incorporated, Chicago, Ill., a corporation of Delaware No Drawing. Application February 2, 1942, Serial No. 429,283

11 Claims. (Cl. 260—535)

This invention relates to the preparation of acids and is concerned particularly with the purification of impure aqueous solutions of organic acids.

The principal object of the invention is to provide a new and improved method for the preparation of pure organic acids.

Another object of the invention is a novel and economical method for the purification of relatively concentrated aqueous solutions of organic acids which contain as impurities relatively small quantities of stronger inorganic acids.

A further object of the invention is a process for the selective removal of relatively small amounts of anions of inorganic acids from aqueous solutions of organic acids.

Other objects of the invention will become apparent on further reading of this specification and the appended claims.

Many organic acids are now prepared by methods which of necessity leave in the product appreciable and often objectionable quantities of stronger inorganic acids or the anions of those acids; by "stronger inorganic acids" we mean, of course, inorganic acids exhibiting in aqueous solutions a greater degree of ionization, i. e., having a higher dissociation constant than the organic acid in question. Methods heretofore employed for removing such undesired impurities from the acid are frequently cumbersome, costly, and not always effective.

An example is the case of lactic acid, which is now in increasing demand in a high state of purity in the manufacture of plastics, in special food processing, and for other purposes. Basically, the acid is usually prepared by the bacterial oxidation of the lactose present in the whey of casein-free milk. The lactic acid thus formed is typically neutralized with lime. The resultant calcium lactate is separated out by concentration and crystallization. Lactic acid is again set free by the addition of sulfuric acid, calcium sulfate being precipitated at the same time.

The lactic acid solution separated from the precipitate is only moderately pure, since it usually contains appreciable amounts of free sulfuric and hydrochloric acids and some sodium and calcium sulfates and chlorides. Further refining by methods heretofore employed involve fractional crystallization, esterification, saponification, and fractional distillation. A brief description of these methods is given by Smith and Claborn in the News Edition of Industrial and Engineering Chemistry, volume 17, page 641 (1939). Needless to say, these methods are cumbersome, time-consuming and expensive, and of limited effectiveness.

We have discovered a much more simple, direct, and economical method of freeing the lactic acid solution from sulfuric and hydrochloric acids and their anions, a method which we have found generally applicable for freeing relatively concentrated solutions of organic acids from relatively smaller amounts of stronger inorganic acids.

In a typical embodiment of the method, the impure solution of the organic acid is contacted with an anion-exchange material such as the m-phenylenediamine-formaldehyde resins of Adams and Holmes described in U. S. Patent No. 2,151,883, dated March 28, 1939, or the diguanide-aldehyde resins of Swain described in U. S. Patent No. 2,251,234, dated July 29, 1941, or equivalent organic or inorganic anion-exchange bodies. Preferably, but not necessarily, this contact is secured by passing the solution through a bed of the anion-exchange bodies. The bed of anion-exchange material, after regeneration with alkali in the usual manner, desirably is saturated with the organic acid (e. g. lactic acid in the case above) before being subjected to contact with the impure solution of the organic acid to be treated.

In order to demonstrate the basic principles and operation of our invention, two examples will be given of readily reproducible small-scale tests which we have made in connection with the refining of lactic acid.

*Example 1.*—A synthetic acid solution was prepared containing per liter approximately 40,000 milligrams lactic acid, 400 milligrams sulfuric acid, and 100 milligrams hydrochloric acid (all expressed in terms of calcium carbonate equivalent). This solution was passed through a 25 ml. bed of anion-exchange amino-resin, screened 24 to 30 mesh, the bed being approximately 25 mm. in diameter. Previous to its use for the purification test, the bed had been regenerated with 300 ml. of an 0.5% solution of sodium hydroxide, then washed free of excess alkali, and finally saturated with lactic acid by treatment with a solution of pure lactic acid. During the purification run, the impure lactic acid solution was passed downwardly through the bed at a rate of 21 ml. per minute, equivalent to a rate of 1 gallon per minute per square foot of bed area. Tests on successive portions of the effluent gave the following results:

| Volume in liters | Residual $H_2SO_4$, mg. per l. | Residual HCl mg. per l. | Residual H. Lac, mg. per l. |
|---|---|---|---|
| 0.0–0.1 | 0 | 0 | 30,000 |
| 0.1–0.2 | 0 | 0 | 33,000 |
| 0.2–0.3 | 0 | 0 | 34,000 |
| 0.3–0.4 | 0 | 0 | 35,000 |
| 0.4–0.5 | 0 | 0 | 37,000 |
| 0.5–0.6 | 0 | 0 | 37,000 |
| 0.6–0.7 | 0 | 0 | 37,000 |
| 0.7–0.8 | 0 | 0 | 36,000 |
| 0.8–0.9 | 0 | 0 | 37,000 |
| 0.9–1.0 | 0 | 5 | 36,000 |
| 1.0–1.1 | 0 | 12 | 37,000 |
| 1.1–1.2 | 0 | 15 | 38,000 |
| 1.2–1.3 | 0 | 17 | 40,000 |
| 1.3–1.4 | 0 | 20 | 40,000 |
| 1.4–1.5 | 0 | 27 | 40,000 |

It will be evident from an inspection of this table that the selective removal and replacement of sulfuric and hydrochloric acids by this process is remarkably effective in spite of the vastly higher concentration of lactic acid. It will be seen also that the removal capacity for the sulfuric and hydrochloric acids is quite high; if the "end point" of the run summarized above is taken at 1.3 liters, when the hydrochloric acid content had reached 17 mg. per liter, the selective acid-removal capacity of the resin for sulfuric and hydrochloric acids is approximately 12,000 grains per cubic foot (in terms of calcium carbonate). This is equivalent to the very high purification capacity of over 400 gallons of the impure acid per cubic foot of resin.

*Example 2.*—To U. S. P. lactic acid containing approximately 85% lactic acid, almost no sulfates, and about 200 mg. chloride per liter, was added sufficient hydrochloric and sulfuric acids to produce a total of 600 mg. hydrochloric acid per liter and 750 mg. sulfuric acid per liter, all in terms of calcium carbonate. This solution was passed through a 25 ml. bed of 24–30 mesh anion-exchange resin which had been regenerated with sodium hydroxide solution as in Example 1, but which had not been subsequently saturated with lactic acid. Over 800 ml. of the solution was passed through the bed without the appearance of any sulfate or chloride in the effluent, equivalent to a treating capacity of almost 250 gallons of impure acid per cubic foot of resin.

Saturating the bed of anion-exchange material with lactic acid before beginning the treatment of impure acid solution appears to provide at once proper equilibrium conditions in the bed for optimum purification. In consequence, the danger of possible "leakage" of the inorganic acid through the bed is minimized, and the overall concentration of acidity of the effluent is not appreciably reduced by the treatment.

In case the impure lactic acid solution contains undesired neutral salts of stronger inorganic acids, such as calcium or sodium sulfates or chlorides, these will be converted to the corresponding salts of lactic acid, e. g. calcium or sodium lactate, as a result of the anion-exchange treatment. This conversion or replacement is sometimes all that is required. If, however, it is desired to remove the metallic ions (e. g. calcium or sodium) bodily, this may be accomplished by treatment of the solution with a hydrogen exchange material, such as one of the so-called "carbonaceous zeolites" which has been regenerated with an acid, such as sulfuric or hydrochloric acid. The free inorganic acid thus formed by hydrogen exchange, together with the free inorganic acids originally present in the solution, are removed and replaced to the extent desired by subjecting the effluent from the hydrogen exchange treatment to a selective acid-removal or anion-exchange treatment, as for instance in the manner described in Examples 1 and 2.

A wide range of organic acids may similarly be purified and freed from relatively smaller amounts of stronger inorganic acids and salts of such acids. Thus, for example, citric acid is typically prepared from lemons by neutralizing the citric acid in the juice with lime, separating the calcium citrate, treating the calcium citrate with sulfuric acid to set free citric acid again, separating the precipitated calcium sulfate from the solution, and concentrating and crystallizing the citric acid from the solution. Here, again, the citric acid solution after separation from the precipitated calcium sulfate contains appreciable amounts of free sulfuric acid and neutral salts of inorganic acids stronger than citric acid. Using the methods of our invention, this citric acid may be freed from free sulfuric acid by selective acid-removal processes corresponding to those described for the purification of lactic acid above, and from salts of sulfuric or other inorganic acids stronger than citric acid by the combination of hydrogen exchange treatment and selective anion-removal such as has been described above in connection with the purification of lactic acid. Due to the removal of these impurities, both the yield and quality of the citric acid crystallized from the purified solution will be materially enhanced.

The following readily-reproducible laboratory test demonstrates the practicability of removing free inorganic acids stronger than citric acid from a solution of citric acid by the method of our invention: A concentrated solution of citric acid was prepared by dissolving 200 grams of C. P. mono-hydrated acid in 500 ml. of a solution containing per liter 300 milligrams each of hydrochloric and sulfuric acids (both expressed in terms of calcium carbonate). This solution was then passed through a 25 ml. bed of the same anion-exchange resin employed in the tests with lactic acid. The resin in this case, however, had previously been saturated with citric acid. In only a single pass through the resin bed, the entire volume of citric acid solution (something more than 0.5 liter) was freed completely of hydrochloric and sulfuric acids, the chloride and sulfate in the treated effluent solution being zero.

Tartaric acid is another organic acid we have purified by the methods of our invention. Among other possible applications that may be mentioned is the removal of inorganic impurities from malic, fumaric, succinic, levulinic, gallic and other acids prepared by fermentation methods.

By employing the processes of our invention solutions of organic acids may be freed not only from the hydrochloric and sulfuric acids and chlorides and sulfates mentioned above, but also from the anions of other inorganic acids such as phosphoric, nitric, and the like, and from these acids themselves, providing that the inorganic acid impurity is stronger and is present in relatively smaller amount then the organic acid being purified.

The processes of our invention readily lend themselves to cyclic operation. Thus, the spent anion-exchange material, after purification of an appropriate portion of the organic acid solution, may be regenerated in the usual manner with a solution of an alkali such as sodium or potassium hydroxide, carbonate, or bicarbonate or ammonium hydroxide, followed, if desired, by saturation of the anion-exchange material with the organic acid in question by treating the material with a substantially pure solution of the acid; after regeneration the material is ready for the treatment of a fresh portion of the impure solution of organic acid. Similarly, if a hydrogen-exchange material is employed in the purification process, the spent material may be regenerated with an acid such as sulfuric or hydrochloric acid.

From the foregoing disclosure it will be evident that the directness, simplicity and economy and other beneficial characteristics of the method of our invention constitute a marked improvement over prior art methods.

While the processes of our invention will naturally be susceptible to many modifications by those skilled in the art, the salient features of our invention are intended to be set forth and defined in the appended claims.

We claim:

1. A process for purifying an impure aqueous solution of an organic acid containing substantially smaller amounts of inorganic acids, said inorganic acids being stronger from the standpoint of dissociation than said organic acids, which comprises subjecting the solution to contact wtih an anion-exchange material.

2. A process for selectively removing from an aqueous solution of an organic acid anions of stronger inorganic acids contained therein in an amount not in excess of two per cent of the organic acid content which comprises subjecting the solution to contact with an anion-exchange material.

3. A process for removing sulfuric and hydrochloric acids from an aqueous lactic acid solution containing an amount of said inorganic acids less than about one per cent of the lactic acid content which comprises subjecting the solution to contact with an anion-exchange material.

4. A process for removing sulfuric and hydrochloric acids from an aqueous citric acid solution containing an amount of said inorganic acids less than about one per cent of the citric acid content which comprises subjecting the solution to contact with an anion-exchange material.

5. A process for purifying an aqueous solution of an organic acid containing not more than about one part of a metallic salt of a stronger inorganic acid to about eighty parts of organic acid which comprises first replacing the metal with hydrogen by subjecting the solution to a hydrogen exchange treatment and subsequently replacing the anion of the inorganic acid with the anion of the organic acid by treatment with an anion-exchange material.

6. A process for purifying an impure aqueous solution of an organic acid containing an amount of an inorganic acid not in excess of about one per cent of the organic acid content thereof, said inorganic acid being stronger from the standpoint of dissociation than said organic acid, which comprises subjecting the solution to contact with an anion-exchange material, continuing the purification treatment until a substantial portion of the purification capacity of the anion-exchange material has been exhausted, regenerating the anion-exchange material with the solution of an alkali, and subjecting a fresh portion of the impure solution of organic acid to contact with the regenerated anion-exchange material.

7. The process of selectively removing an inorganic acid from a solution of an organic acid, said solution containing at least about eighty parts of organic acid to each part of inorganic acid, comprising subjecting the solution to contact with an anion-exchange material.

8. The process of selectively removing salts of an inorganic acid from a solution of an organic acid containing not more than about one part of said inorganic salt to about eighty parts of organic acid comprising the steps of first contacting the solution with a hydrogen exchange material and subsequently contacting the partially treated solution with an anion exchange material.

9. A process for separating a strong inorganic acid from an aqueous solution of an organic acid containing minute amounts of said inorganic acid which comprises subjecting the solution to contact with an anion exchange material.

10. A process for removing a strong inorganic acid from an aqueous solution of citric acid containing minute amounts of said inorganic acid which comprises subjecting the solution to contact with an anion exchange material.

11. A process for removing a strong inorganic acid from an aqueous solution of lactic acid containing minute amounts of said inorganic acid which comprises contacting the solution with an anion exchange material.

JAMES C. HESLER.
ABRAHAM SIDNEY BEHRMAN.

REFERENCES CITED

The following references are of record in the file of this patent:

UNITED STATES PATENTS

| Number | Name | Date |
|---|---|---|
| 2,253,061 | Cole | Aug. 19, 1941 |
| 2,258,216 | Ramage | Oct. 7, 1941 |
| 2,105,701 | Ramage | Jan. 18, 1938 |
| 2,228,514 | Griessbach | Jan. 14, 1941 |
| 2,223,930 | Griessbach | Dec. 3, 1940 |
| 2,251,234 | Swain | July 29, 1941 |
| 2,151,883 | Adams, et al | Mar. 28, 1939 |
| 1,993,259 | Buc | Mar. 5, 1935 |
| 1,945,246 | Witzel | Jan. 30, 1934 |
| 1,822,016 | Daniels | Sept. 8, 1931 |
| 2,240,116 | Holmes | Apr. 29, 1941 |

FOREIGN PATENTS

| Number | Country | Date |
|---|---|---|
| 805,092 | French | Nov. 10, 1936 |

OTHER REFERENCES

Schwartz, et al., Ind. and Eng. Chem., vol. 32, page 1462. (Copy in Patent Office Library.)